(12) United States Patent
DeLapp et al.

(10) Patent No.: US 11,467,407 B2
(45) Date of Patent: Oct. 11, 2022

(54) DISPLAYS WITH VOLUME PHASE GRATINGS

(71) Applicant: Apple Inc., Cupertino, CA (US)

(72) Inventors: Scott M. DeLapp, Sunnyvale, CA (US); Byron R. Cocilovo, Sunnyvale, CA (US); Se Baek Oh, Millbrae, CA (US); Bradley C. Steele, San Diego, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 16/632,830

(22) PCT Filed: Aug. 14, 2018

(86) PCT No.: PCT/US2018/046717
§ 371 (c)(1),
(2) Date: Jan. 21, 2020

(87) PCT Pub. No.: WO2019/067100
PCT Pub. Date: Apr. 4, 2019

(65) Prior Publication Data
US 2020/0166756 A1 May 28, 2020

Related U.S. Application Data

(60) Provisional application No. 62/563,422, filed on Sep. 26, 2017.

(51) Int. Cl.
*G02B 27/01* (2006.01)
*F21V 8/00* (2006.01)
*G03H 1/02* (2006.01)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ........ G02B 27/0172; G02B 2027/0174; G02B 2027/0178; G02B 6/0016; G02B 6/0038; G03H 1/0248
(Continued)

(56) References Cited

U.S. PATENT DOCUMENTS 6,580,529 B1 6/2003 Amitai et al.
9,406,166 B2 8/2016 Futterer
(Continued)

FOREIGN PATENT DOCUMENTS

CN 1892271 A 1/2007
CN 103995354 A 8/2014
(Continued)

*Primary Examiner* — Collin X Beatty
(74) *Attorney, Agent, or Firm* — Treyz Law Group, P.C.; Kendall P. Woodruff

(57) ABSTRACT

An electronic device may have a display system that produces images. The display system may have one or more pixel arrays such as liquid-crystal-on-silicon pixel arrays. Images from the display system may be coupled into a waveguide by an input coupler and may be coupled out of the waveguide using an output coupler. The input and output couplers may be formed from volume phase holographic gratings. An additional grating may be used to shift light that would otherwise pass above or below the user's field of view towards the viewer. Holographic gratings in the waveguide may have fringes with constant pitch and variable period. The period at a given portion of the grating may be Bragg-matched to maximize diffraction efficiency for light of a given incident angle.

15 Claims, 11 Drawing Sheets

(52) U.S. Cl.
CPC ............... *G02B 2027/0174* (2013.01); *G02B 2027/0178* (2013.01); *G03H 1/0248* (2013.01)

(58) Field of Classification Search
USPC .......................................................... 359/34
See application file for complete search history.

(56) References Cited

U.S. PATENT DOCUMENTS

| | | |
|---|---|---|
| 9,746,684 B2 | 8/2017 | Kroll et al. |
| 9,927,571 B2 | 3/2018 | Futterer |
| 2009/0040580 A1 | 2/2009 | Mukawa |
| 2014/0140653 A1* | 5/2014 | Brown ................. G02B 6/0033 385/10 |
| 2015/0243095 A1 | 8/2015 | Schowengerdt |
| 2019/0369403 A1 | 12/2019 | Leister |

FOREIGN PATENT DOCUMENTS

| | | |
|---|---|---|
| CN | 106575034 A | 4/2017 |
| CN | 106662685 A | 5/2017 |
| WO | 9952002 A1 | 10/1999 |

* cited by examiner

DISPLAYS WITH VOLUME PHASE GRATINGS

This application claims the benefit of provisional patent application No. 62/563,422, filed Sep. 26, 2017, which is hereby incorporated by reference herein in its entirety.

BACKGROUND

This relates generally to devices with displays, and, more particularly, to head-mounted displays.

Head-mounted displays may be used to display virtual reality and augmented reality content. A head-mounted display that is displaying augmented reality content may overlay computer-generated images on real-world objects. Displays and optical systems may be used to create images and to present those images to a user.

If care is not taken, however, the components used in displaying content for a user in a head-mounted display may not exhibit desired levels of optical performance.

SUMMARY

An electronic device may have a display system that produces images. An optical system with one or more waveguides and input and output coupler systems may be used to distribute the images to a user.

The display system may have one or more pixel arrays such as liquid-crystal-on-silicon pixel arrays. Images from the display system may be coupled into one or more waveguides by an input coupler system and may be coupled out of the waveguide in multiple image planes using an output coupler system. The input and output coupler systems may include single couplers, stacks of couplers, and tiled arrays of couplers. The couplers may be volume phase holographic gratings or other optical couplers for coupling light into and out of the upper and lower surfaces of elongated strip-shaped waveguides.

Holographic gratings in the waveguide may have fringes with constant pitch and variable period. The period at a given portion of the grating may be Bragg-matched to maximize diffraction efficiency for light of a given wavelength and incident angle. For example, a first set of fringes may have a first period that maximizes diffraction efficiency for incident light associated with a left field of view, a second set of fringes may have a second period that maximizes diffraction efficiency for incident light associated with a center field of view, and a third set of fringes may have a third period that maximizes diffraction efficiency for a right field of view.

DETAILED DESCRIPTION

Figure 1:
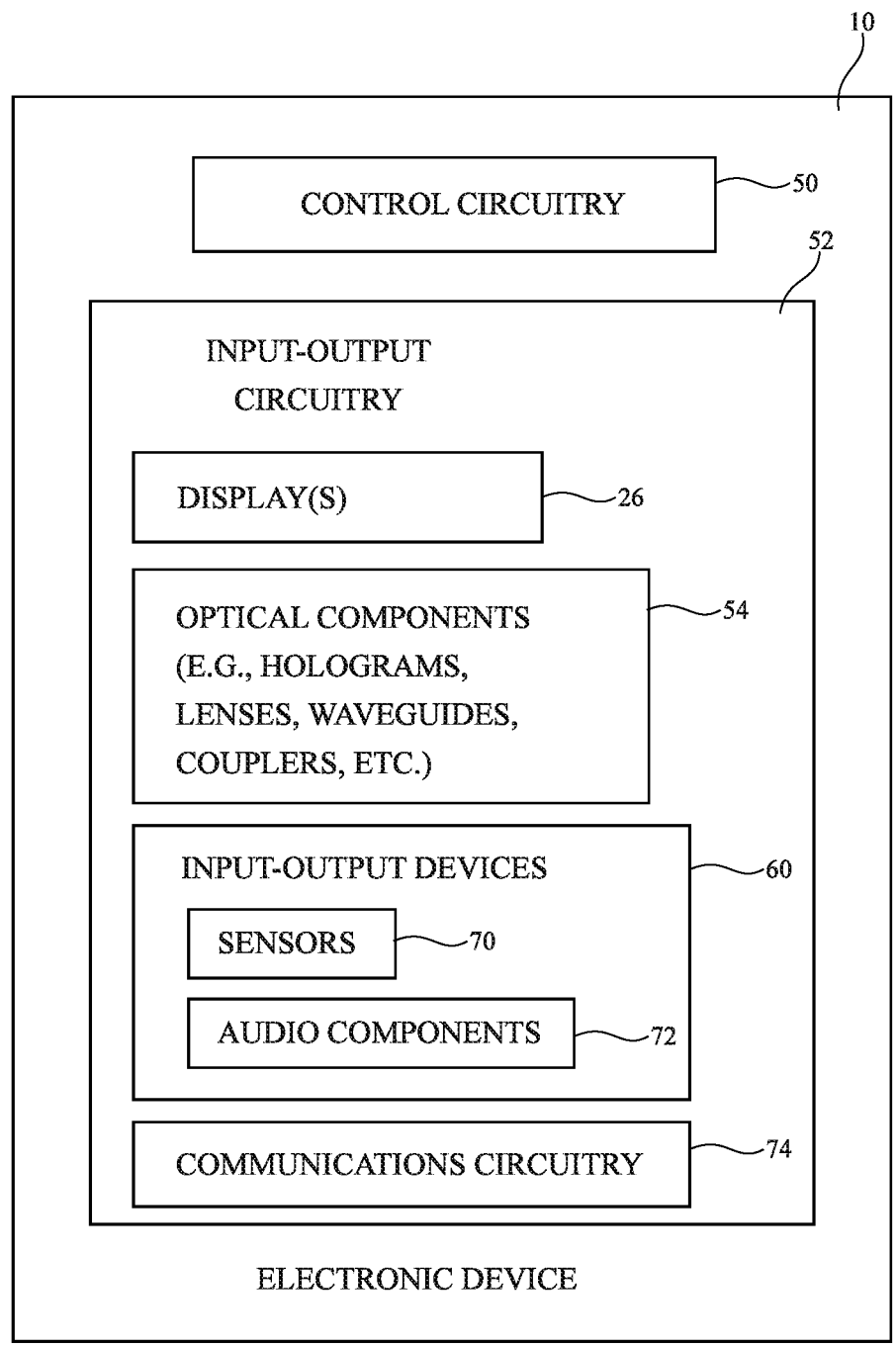
FIG. 1 is a schematic diagram of an illustrative head-mounted display in accordance with an embodiment.

Head-mounted displays and other devices may be used for virtual reality and augmented reality systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include displays and other optical components. Device configurations in which virtual reality and/or augmented reality content is provided to a user with a head-mounted display are described herein as an example. This is, however, merely illustrative. Any suitable equipment may be used in providing a user with virtual reality and/or augmented reality content.

A head-mounted display such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a user. One or more waveguides may be included in the optical system. Input optical couplers may be used to couple images into the waveguides from one or more pixel arrays. Output optical couplers may be used to couple images out of the waveguides for viewing by the user. One or more additional optical couplers in the waveguides may be used to shift the vertical component of light that is out of the field of view towards the user's eyes.

The input couplers, output couplers, and other optical couplers for the optical system may form structures such as Bragg gratings that couple light into the waveguides from the displays and that couple light out of the waveguides for viewing by the user. Optical couplers may be formed from volume phase holographic gratings or other holographic coupling elements. The optical couplers may, for example, be formed from thin layers of polymers, dichromated gelatin, and/or other optical coupler structures in which holographic patterns are recorded using lasers. For example, the interference of two collimated laser beams may produce modulations in the refractive index in the dichromated gelatin, thereby forming a holographic grating. In some configurations, optical couplers may be formed from dynamically adjustable devices such as adjustable gratings formed from microelectromechanical systems (MEMs) components, liquid crystal components (e.g., tunable liquid crystal gratings, polymer dispersed liquid crystal devices), or other adjustable optical couplers. Arrangements in which optical couplers are formed from volume phase holographic gratings are sometimes described herein as an example.

One or more of the volume phase holographic gratings in the optical system may have fringes with a constant pitch, a variable period, and/or a variable fringe angle. Constant-pitch, variable-period gratings may help maintain high diffraction efficiency across a range of angles of incidence for a given wavelength. This type of volume phase holographic grating may in turn help avoid undesirable color shifts, efficiency losses, and brightness variations in the optical system.

A schematic diagram of an illustrative head-mounted display is shown in FIG. 1. As shown in FIG. 1, head-mounted display 10 may have control circuitry 50. Control circuitry 50 may include storage and processing circuitry for controlling the operation of head-mounted display 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement operations for head-mounted display 10 (e.g., data gathering operations, operations involving the adjustment of components using control signals, image rendering operations to produce image content to be displayed for a user, etc.).

Head-mounted display 10 may include input-output circuitry 52. Input-output circuitry 52 may be used to allow data to be received by head-mounted display 10 from external equipment (e.g., a tethered computer, a portable device such as a handheld device or laptop computer, or other electrical equipment) and to allow a user to provide head-mounted display 10 with user input. Input-output circuitry 52 may also be used to gather information on the environment in which head-mounted display 10 is operating. Output components in circuitry 52 may allow head-mounted display 10 to provide a user with output and may be used to communicate with external electrical equipment.

As shown in FIG. 1, input-output circuitry 52 may include one or more displays such as display(s) 26. Display(s) 26 may be used to display images for a user of head-mounted display. Display(s) 26 have pixel array(s) to generate images that are presented to a user through an optical system. The optical system may, if desired, have a transparent portion through which the user (viewer) can observe real-world objects while computer-generated content is overlaid on top of the real-world objects by producing computer-generated images on the display(s) 26.

Optical components 54 may be used in forming the optical system that presents images to the user. Components 54 may include static components such as waveguides, static optical couplers, and fixed lenses. If desired, components 54 may also include adjustable optical components such as an adjustable polarizer, tunable lenses (e.g., liquid crystal tunable lenses, tunable lenses based on electrooptic materials, tunable liquid lenses, microelectromechanical systems (MEMS) tunable lenses, or other tunable lenses), a dynamically adjustable coupler (e.g., an adjustable MEMs grating or other coupler, an adjustable liquid crystal holographic coupler such as an adjustable liquid crystal Bragg grating coupler, adjustable holographic couplers (e.g., electro-optical devices such as tunable Bragg grating couplers, polymer dispersed liquid crystal devices), couplers, lenses, and other optical devices formed from electro-optical materials (e.g., lithium niobate or other materials exhibiting the electro-optic effect), or other static and/or tunable optical components. Components 54 may be used in receiving and modifying light (images) from display 26 and in providing images to a user for viewing. In some configurations, one or more of components 54 may be stacked, so that light passes through multiple components in series (e.g., optical couplers may be stacked or may partially overlap one another). In other configurations, components may be spread out laterally (e.g., optical couplers may be tiled side-by-side). Configurations may also be used in which both tiling and stacking are present.

Input-output circuitry 52 may include components such as input-output devices 60 for gathering data and user input and for supplying a user with output. Devices 60 may include sensors 70, audio components 72, and other components for gathering input from a user or the environment surrounding device 10 and for providing output to a user. Devices 60 may, for example, include keyboards, buttons, joysticks, touch sensors for trackpads and other touch sensitive input devices, cameras, light-emitting diodes, and/or other input-output components.

Cameras or other devices in input-output circuitry 52 may face a user's eyes and may track a user's gaze. Sensors 70 may include position and motion sensors (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 70, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 70.

If desired, sensors 70 may include ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, etc. Audio components 72 may include microphones for gathering voice commands and other audio input and speakers for providing audio output (e.g., ear buds, bone conduction speakers, or other speakers for providing sound to the left and right ears of a user). If desired, input-output devices 60 may include haptic output devices (e.g., vibrating components), light-emitting diodes and other light sources, and other output components. Circuitry 52 may include wired and wireless communications circuitry 74 that allows head-mounted display 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
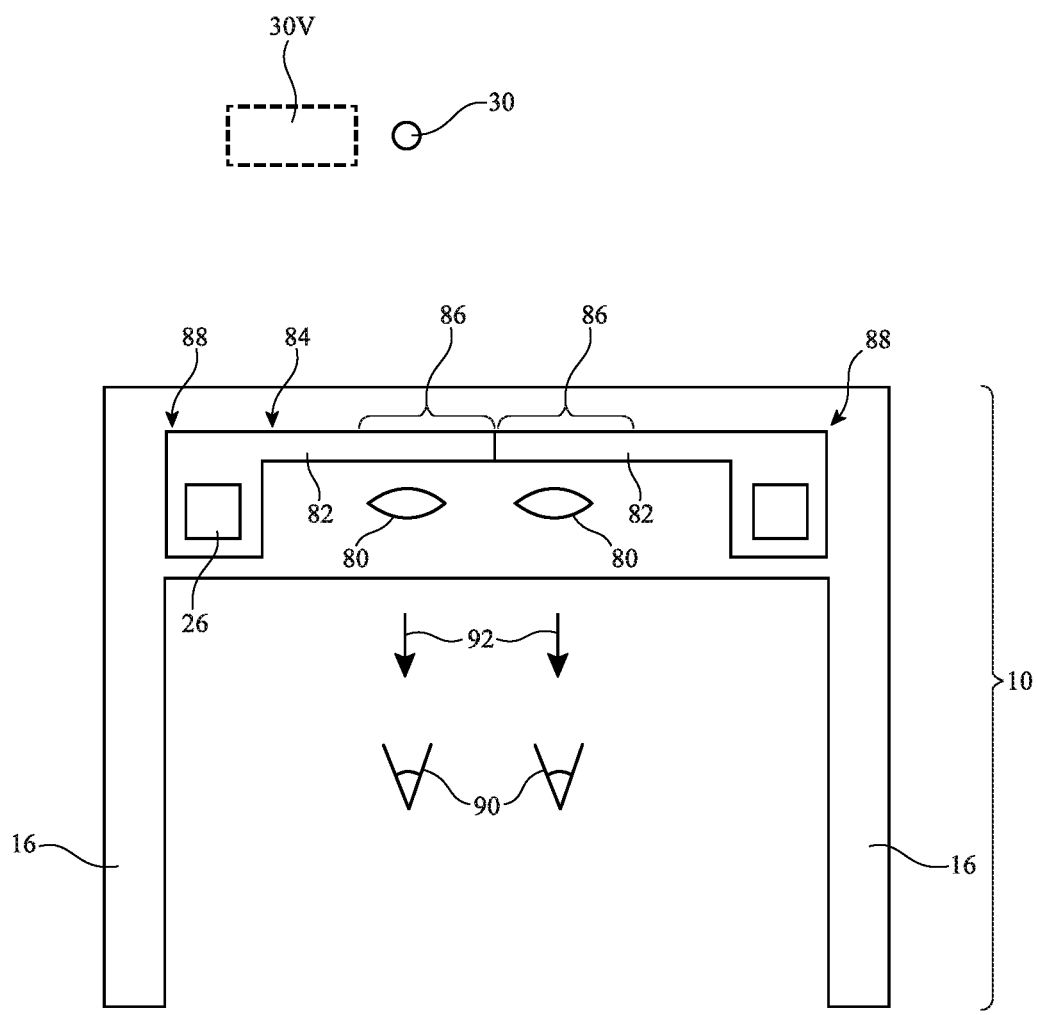
FIG. 2 is a top view of an illustrative head-mounted display in accordance with an embodiment.

The components of head-mounted display 10 may be supported by a head-mountable support structure such as illustrative support structure 16 of FIG. 2. Support structure 16 may be configured to form a frame of a pair of glasses (e.g., left and right temples and other frame members), may be configured to form a helmet, may be configured to form a pair of goggles, or may have other head-mountable configurations.

Optical system 84 may be supported within support structure 16 and may be used to provide images from displays 26 to a user (see, e.g., the eyes of user 90 of FIG. 2). With one illustrative configuration, displays 26 may be located in outer (edge) portions 88 of optical system 84 and may have one or more pixel arrays that produce images. Light associated with the images may be coupled into waveguides in outer portions 88 using input coupler systems. The waveguides may traverse intermediate regions 82. In central portion(s) 86 of system 84 (at the opposing ends of the waveguides from the input coupler systems and displays 26), output coupler systems formed from one or more output couplers may couple the light out of the waveguides. This light may pass through optional lenses 80 in direction 92 for viewing by user 90. Portion 86 of optical system 84 may be transparent, so that user 90 may view external objects such as object 30 through this region of system 84 while system 84 overlays computer-generated content (image content generated by control circuitry 50) with objects such as object 30V.

Figure 3:
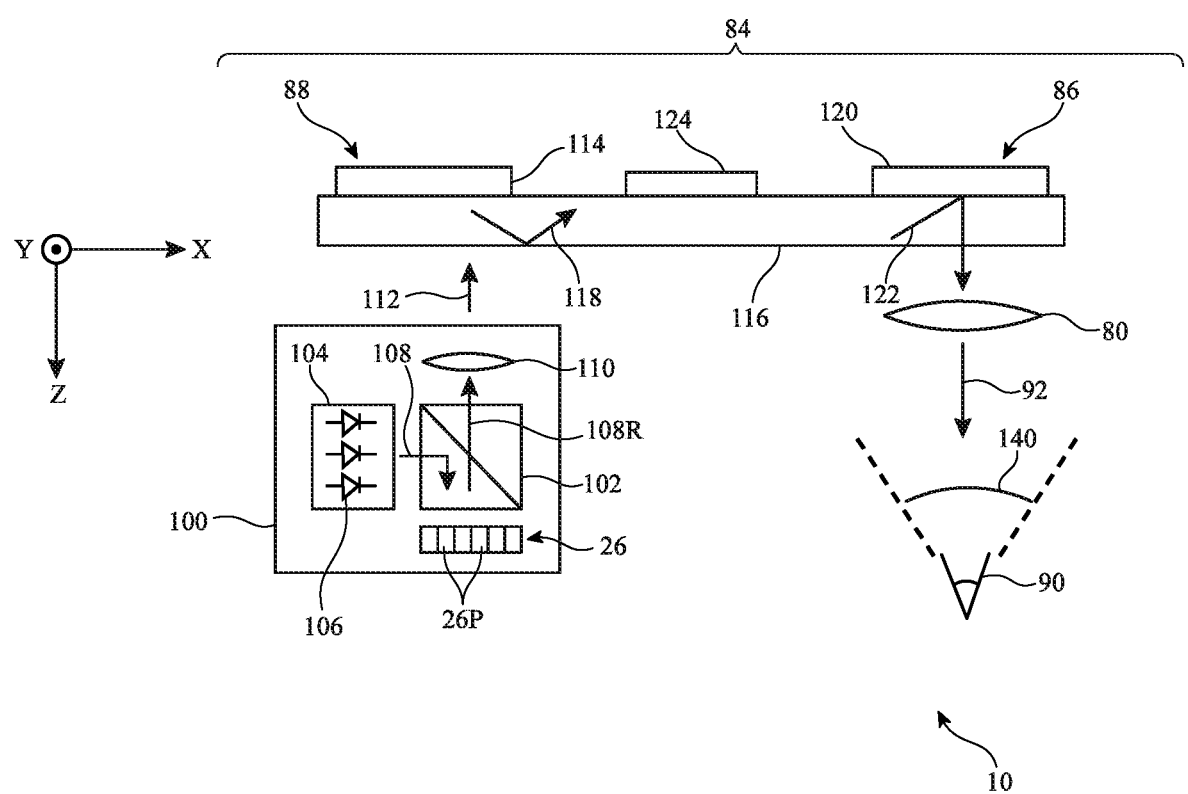
FIG. 3 is a diagram of an illustrative optical system and associated display system for a head-mounted display in accordance with an embodiment.

A portion of an illustrative head-mounted device is shown in FIG. 3. Device 10 may include one or more pixel arrays such as pixel array 26. Pixel array 26 is formed from pixels 26P. There may be any suitable number of pixels 26P in display 26 (e.g., 0-1000, 10-10,000, 1000-1,000,000, 1,000,000 to 10,000,000, more than 1,000,000, fewer than 1,000,000, fewer than 10,000, fewer than 100, etc.). Pixel array 26 may have any suitable type of display pixels (e.g., pixel array 26 may form a display such an organic light-emitting diode display, a display having a pixel array formed from an array of light-emitting diodes each of which is formed from a respective crystalline semiconductor die, a liquid crystal display, a liquid-crystal-on-silicon display, a microelectromechanical systems display, or any other suitable display). In the illustrative configuration of FIG. 3, pixel array 26 forms part of display system 100 in which pixel array 26 is illuminated by light from an illumination system. The illumination system includes light source 104 and optical coupler 102. Light source 104 may include one or more light-emitting components 106. Components 106 may be, for example, light-emitting diodes such as red, green, and blue light emitting diodes, white light emitting diodes and/or light-emitting diodes, lamps, lasers, or other light sources of one or more other colors. Optical coupler 102 may be a beam splitter or other optical component(s) that helps direct light 108 from light source 104 toward pixel array 26.

As shown in FIG. 3, light 108 from light source 104 may be directed towards the surface of pixel array 26 (e.g., a liquid-crystal-on-silicon pixel array) by coupler 102. Light 108 is reflected by pixels 26P, which create an image for viewing by user 90. Reflected light 108R (e.g., image light corresponding to an image formed from the array of pixels 26P) passes through coupler 102 and optional lens 110. This reflected image light (image 112) is received by an input coupler system in input portion 88 of optical system 84.

As shown in FIG. 3, optical system 84 may include one or more waveguides such as waveguide 116. Waveguide 116 may be formed from a transparent material such as clear glass or plastic. Waveguide 116 may be a film or rigid plate that carries holographic media (e.g., photosensitive material such as dichromate gelatin, photopolymer, or other optical structures in which holographic patterns are recorded using lasers). A left-hand waveguide for providing images to a user's left eye 90 is shown in FIG. 3, but system 84 may, in general, include waveguide structures for providing image light to both of a user's eyes. With one illustrative configuration, each waveguide 116 has an elongated strip shape that extends along axis X between opposing first and second ends. Waveguide 116 may, for example, have a height (e.g., a length in dimension Y) of about 1 mm to 100 mm, at least 2 mm, at least 5 mm, less than 50 mm, or other suitable size. Waveguide 116 may have a thickness (e.g., a length in dimension Z) of about 3 mm, 1-5 mm, at least 0.1 mm, at least 0.5 mm, at least 1.5 mm, at least 3 mm, less than 4 mm, less than 5 mm, or other suitable thickness. In dimension X, a left-hand waveguide 116 may extend across about half of a user's face and a right-hand waveguide 116 may extend across the other half of the user's face. Accordingly, waveguides 116 may have lengths in dimension X of about 10 mm to 300 mm, at least 5 mm, at least 20 mm, at least 40 mm, at least 80 mm, at least 100 mm, at least 130 mm, less than 200 mm, less than 150 mm, less than 100 mm, less than 90 mm, etc. Waveguides 116 may be straight (as shown in FIG. 3) or may have a curved shape that wraps around a user's head.

System 84 may have an input coupler system in portion 88. The input coupler system may include one or more input couplers such as input coupler 114. Image light 112 from display 26 may be coupled into waveguide 116 using input coupler 114. Input coupler 114 of FIG. 3 is a reflective coupler (light reflects from coupler 114 into waveguide 116). This is merely illustrative, however. If desired, input couplers such as input coupler 114 may be transmissive couplers (light is coupled into waveguide 116 upon passing through coupler 114).

Within waveguide 116, the light that has been coupled into waveguide 116 may propagate along dimension X in accordance with the principal of total internal reflection. Light 118 may then be coupled out of waveguide 116 by an output coupler system in output portion 86. The output coupler system may include one or more output couplers such as output coupler 120, which couples light 118 out of waveguide 116, as illustrated by light 122. Light 122 may then pass through lenses such as lens 80 in direction 92 for viewing by user 90.

If desired, there may be additional optical couplers in waveguide 116 such as optical coupler 124. Optical coupler 124 may, for example, be used to shift the vertical component of light that would otherwise be outside of the user's field of view (e.g., field of view 140 of FIG. 3) towards the user's eyes 90. Because this type of optical coupler enlarges the user's field of view 140 along dimension Y of FIG. 3, optical coupler 124 may sometimes be referred to as a Y-pupil expansion coupler or vertical field of view expansion grating. Vertical field of view expansion gratings such as grating 124 may be located between input coupler 114 and output coupler 120 (as shown in the example of FIG. 3), maybe located in front of input coupler 114, may be integrated with input coupler 114 and/or output coupler 120, or may be located in other suitable positions.

The optical couplers in system 84 may be holographic couplers (e.g., volume phase holographic gratings). The couplers may be plane-to-plane couplers (infinite focal length) or may have an associated finite focal length f (e.g., these couplers may have an associated positive or negative lens power).

The example of FIG. 3 in which couplers 114, 120, and 124 are located on a rear surface of waveguide 116 is merely illustrative. If desired, couplers 114, 120, and 124 may be located on a front surface of waveguide 116 (e.g., opposite the surface shown in FIG. 3), may be embedded within waveguide 116, or may be partially embedded in waveguide 116.

Optical couplers in waveguide 116 such as input coupler 114, output coupler 120, and vertical field of view expansion grating 124 may be formed from volume phase holographic gratings or other holographic coupling elements. The optical couplers may, for example, be formed from thin layers of polymers, dichromated gelatin, and/or other optical coupler structures in which holographic patterns are recorded using lasers. For example, the interference of two collimated laser beams may produce periodic modulations in the refractive index in the dichromated gelatin, thereby forming a holographic grating.

Figure 4:
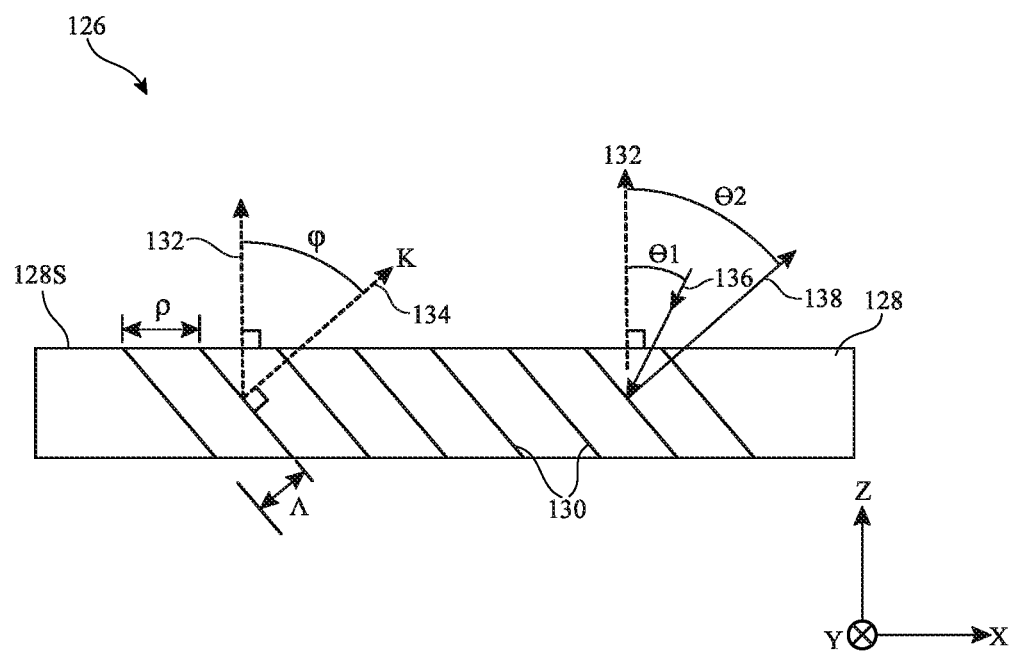
FIG. 4 is a top view of an illustrative volume phase holographic grating with constant pitch and constant period in accordance with an embodiment.

FIG. 4 is a top view of an illustrative volume phase holographic grating that may be used to form optical couplers in a head-mounted display. As shown in FIG. 4, grating 126 may include a medium such as holographic medium 128. Holographic medium 128 may be dichromated gelatin, polymer, or other suitable material. Holographic medium 128 may have a periodic modulation of refractive index. The modulation of refractive index in grating 126 occurs in periodic fringes such as fringes 130. The portions of holographic medium 128 that form fringes 130 may have one refractive index, whereas the portions of holographic medium 128 between fringes 130 may have a different refractive index. Grating 126 may form an optical interference pattern that stores a holographic recording within holographic medium 128.

In the example of FIG. 4, fringes 130 are parallel to and equidistant from one another. Gratings of this type may sometimes be referred to as linear gratings. In other words, the period Λ is constant across grating 126, the pitch ρ is constant across grating 126, and the fringe angle φ is constant across grating 126. The period Λ refers to the spacing between fringes 130 as measured along the grating vector K (i.e., vector 134 orthogonal to fringes 130). The pitch p refers to the distance between fringes 130 as measured along the grating surface 128S. The fringe angle φ refers to the angle between the grating surface normal (i.e., vector 132) and the grating vector K (i.e., vector 134 orthogonal to fringes 130).

When light is incident on the surface of grating 128, the pitch ρ determines the diffraction angle according to the following grating equation:

$$\frac{\lambda_0}{\rho n} = \sin\theta_1 + \sin\theta_2 \quad (1)$$

where $\lambda_0$ is the wavelength of incident light 136 in air, ρ is the pitch of grating 126, n is the refractive index of medium 128, θ1 is the angle of incident light 136 (as measured from grating surface normal 132), and θ2 is the angle of diffracted light 138 (as measured from grating surface normal 132). Thus, in order to achieve the same diffraction angle θ2 across grating 126, grating 126 has the same pitch ρ across grating 126.

In a volume phase holographic grating, maximum diffraction efficiency occurs when the Bragg condition is satisfied, which occurs when the following is true:

$$\cos(\phi - \theta 1) = \frac{\lambda_0}{2n\Lambda} \quad (2)$$

Figure 5:
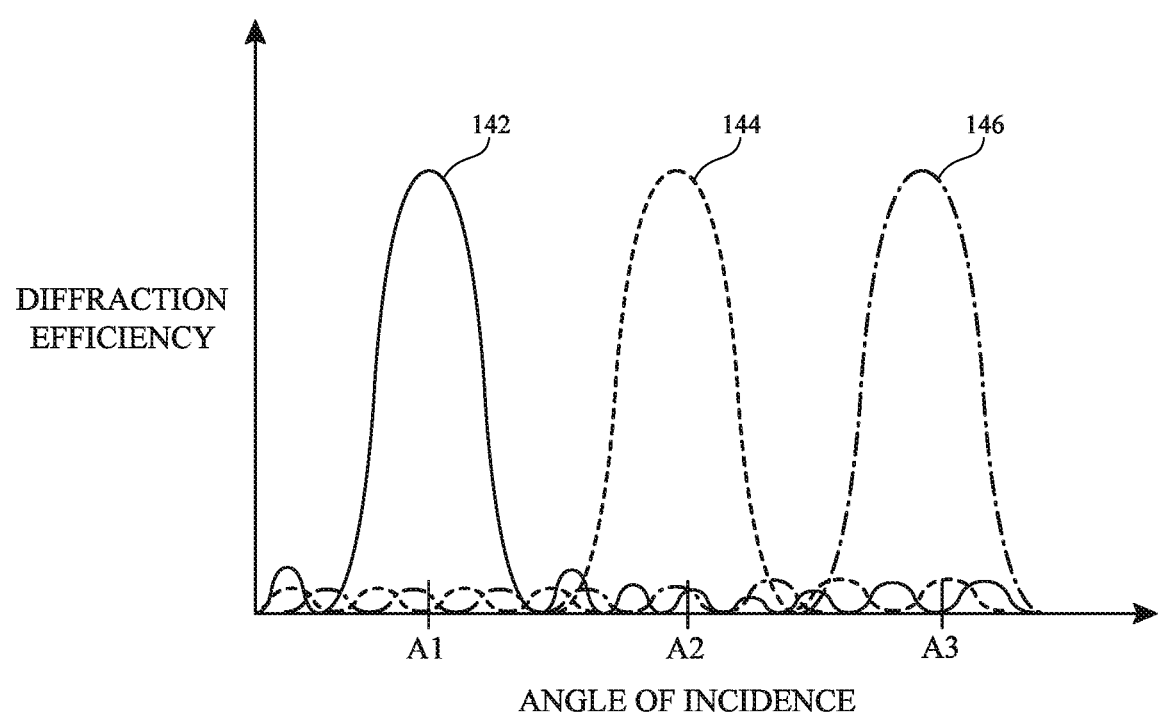
FIG. 5 is a graph showing how different angles of incidence can result in different diffraction efficiencies for a volume phase holographic grating with constant period in accordance with an embodiment.

As shown in Equation 2 above, different incident angles may result in a change in wavelength at which maximum diffraction efficiency occurs. FIG. 5 illustrates how diffraction efficiency may be dependent upon incident angle and wavelength. FIG. 5 is a graph showing diffraction efficiency for a grating having parallel fringes with constant pitch and constant period (e.g., a grating of the type shown in FIG. 4). Curve 142 represents the diffraction efficiency for light of a first wavelength λ1, curve 144 represents the diffraction efficiency for light of a second wavelength λ2, and curve 146 represents the diffraction efficiency for light of a third wavelength λ3. When illuminated with a given color of light (e.g., having a peak wavelength λ3), the wavelength at which maximum diffraction efficiency occurs will change as the angle of incidence changes (according to Equation 2). At angle of incidence A3, maximum diffraction efficiency occurs at the desired wavelength λ3, as illustrated by curve 146. At angle of incidence A2, however, maximum diffraction efficiency occurs at wavelength λ2, as illustrated by curve 144. And at angle of incidence A1, maximum diffraction efficiency occurs at wavelength 1λ, as illustrated by curve 142. Wavelengths λ1 and λ2 may be slightly different than the desired wavelength λ3.

If care is not taken, the dependence of diffraction efficiency on incident angle can present obstacles. For example, lasers may not be suitable for the illumination source because the narrow spectrum would result in a small field of view. Users may perceive visible color shifts and/or brightness variations because the wavelength with highest diffraction efficiency can vary across the field of view. Additionally, at any given incident angle, a subset of the spectra of incident light may be diffracted into the waveguide, resulting in efficiency loss.

To achieve high diffraction efficiency for the same wavelength at different incident angles, the period and/or fringe angle of the grating may be varied across the grating. In other words, the period Λ may be adjusted to satisfy Equation 2, even as incident angle changes. To ensure that the diffraction angle remains constant across the grating, the pitch ρ should remain constant across the grating. To vary the period without changing the pitch, the fringe angle φ may be adjusted accordingly. Period, pitch, and fringe angle are related by the following equation:

$$\rho = \frac{\Lambda}{\sin\varphi} \quad (3)$$

Figure 6:
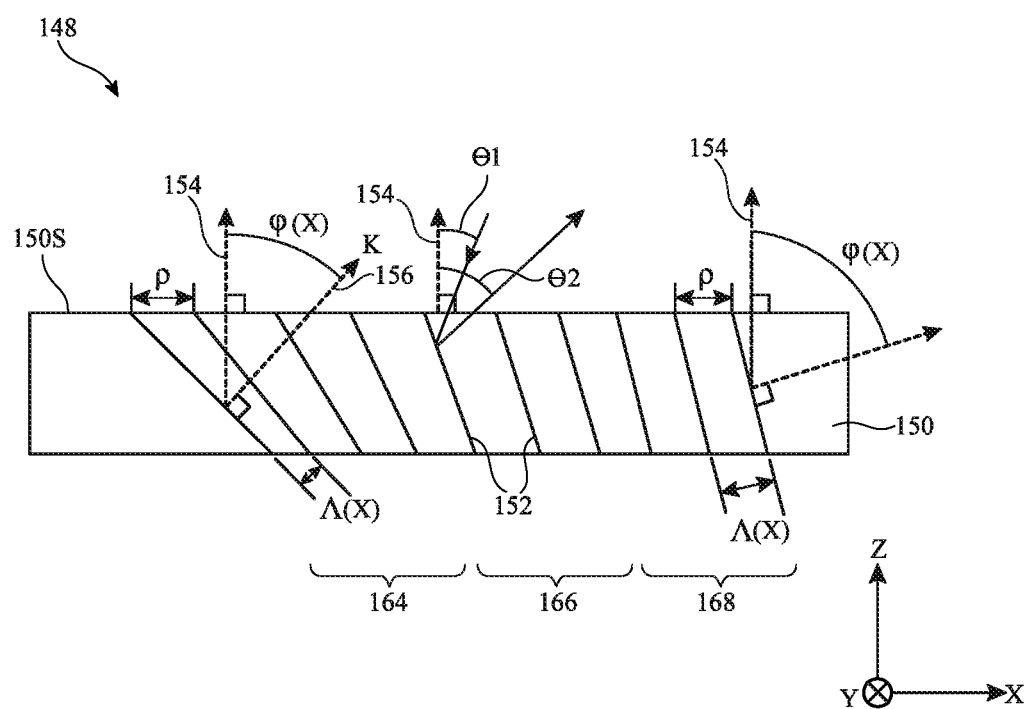
FIG. 6 is a top view of an illustrative volume phase holographic grating with constant pitch and variable period in accordance with an embodiment.

FIG. 6 is a top view of an illustrative volume phase grating having constant pitch and variable period that may be used to form one or more optical couplers in a head-mounted display (e.g., a head-mounted display of the type shown in FIG. 3). As shown in FIG. 6, grating 148 may include a medium such as holographic medium 150. Holographic medium 150 may be dichromated gelatin, polymer, or other suitable material. Holographic medium 150 may have a periodic modulation of refractive index. The modulation of refractive index in grating 148 occurs in periodic fringes such as fringes 152. The portions of holographic medium 150 that form fringes 152 may have one refractive index, whereas the portions of holographic medium 150 between fringes 152 may have a different refractive index. Grating 148 may form an optical interference pattern that stores a holographic recording within holographic medium 150.

In the example of FIG. 6, fringes 152 have constant pitch and variable period. In other words, the period Λ(x) varies across grating 148 (e.g., varies as a function of position along the X-axis of FIG. 6), the pitch ρ is constant across grating 148, and the fringe angle φ(x) varies across grating 148 (e.g., varies as a function of position along the X-axis of FIG. 6). As in the example of FIG. 4, the period Λ refers to the spacing between fringes 152 as measured along the grating vector K (i.e., vector 156 orthogonal to fringes 152); the pitch ρ refers to the distance between fringes 152 as measured along the grating surface 150S; the fringe angle φ refers to the angle between the grating surface normal (i.e., vector 154) and the grating vector K (i.e., vector 156 orthogonal to fringe 152).

Because the pitch of grating 148 remains constant while the period changes, diffraction angle θ2 may remain the same across grating 148, while the maximum diffraction efficiency for a given wavelength may remain high even at different field angles (i.e., different angles of incidence). This is achieved by ensuring that the Bragg condition (Equation 2) is satisfied at each location on grating 148. In other words, the diffraction efficiency at each portion of grating 148 may be tailored (e.g., Bragg-matched) to the field angles that are incident on that portion of grating 148. For example, for a given wavelength, fringes 152 in portion 164 of grating 148 may have a period that maximizes diffraction efficiency at incident angles associated with a left field of view; fringes 152 in portion 166 of grating 148 may have a period that maximizes diffraction efficiency at incident angles associated with a center field of view; and fringes 152 in portion 168 of grating 148 may have a period that maximizes diffraction efficiency at incident angles associated with a right field of view.

Figure 7:
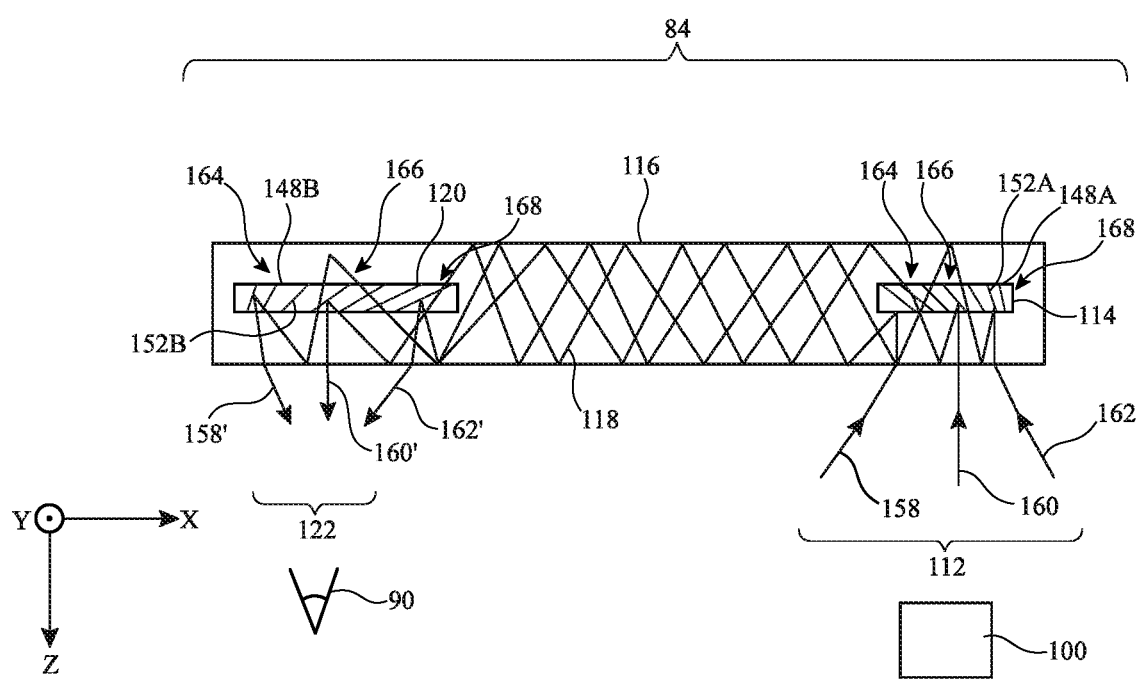
FIG. 7 is a top view of an illustrative optical system having one or more volume phase holographic gratings of the type shown in FIG. 6 in accordance with an embodiment.

FIG. 7 illustrates how gratings with constant pitch and variable period (e.g., gratings of the type shown in FIG. 6) may be incorporated into optical system 84 of head-mounted display 10 (e.g., a head-mounted device of the type shown in FIG. 3). In this example, optical system 84 may be used to deliver light 112 from display system 100 to a user's right eye 90, as illustrated by light 122.

As discussed in connection with FIG. 3, input coupler 114 may be used to couple light 112 from display system 100 into waveguide 116. Within waveguide 116, the light that has been coupled into waveguide 116 may propagate along dimension X in accordance with the principal of total internal reflection. Light 118 may then be coupled out of waveguide 116 towards viewer 90 by output coupler 120, as illustrated by light 122.

Incident light 112 may have different field angles such as left field of view light 158, center field of view light 160, and right field of view light 158. Left field of view light 158 reaches viewer 90 as light 158' to form a left portion of an image, center field of view light 160 reaches viewer 90 as light 160' to form a center portion of an image, and right field of view light 162 reaches viewer 90 as light 162' to form a right portion of an image.

Input coupler 114 and output coupler 120 may be formed from gratings having constant pitch and variable period, as discussed in connection with FIG. 6. For example, input coupler 114 may be formed from grating 148A having fringes 152A, and output coupler 120 may be formed from grating 148B having fringes 152B. In each grating, the fringes may be tailored to maximize diffraction efficiency for a given range of field angles. Fringes in portion 164 of each grating may have a period that maximizes diffraction efficiency for left field of view light 158; fringes in portion 166 of each grating may have a period that maximizes diffraction efficiency for center field of view light 160; and fringes in portion 168 of each grating may have a period that maximizes diffraction efficiency right field of view light 162. To maximize diffraction efficiency at a given field angle for a given wavelength at a given location of the grating, the period of the grating at that location may be determined according to Equation 2. This is sometimes referred to as Bragg-matching the grating to the incident angle and wavelength of incident light. This ensures that, for a given color of incident light, left field of view light 158' of that color, center field of view light 160' of that color, and right field of view light 162' of that color all reach viewer 90 with uniform diffraction efficiency. This helps avoid color shifts, brightness variations, and efficiency losses, while also allowing for both broadband illumination sources and narrow spectrum illumination sources (e.g., lasers).

Figure 8:
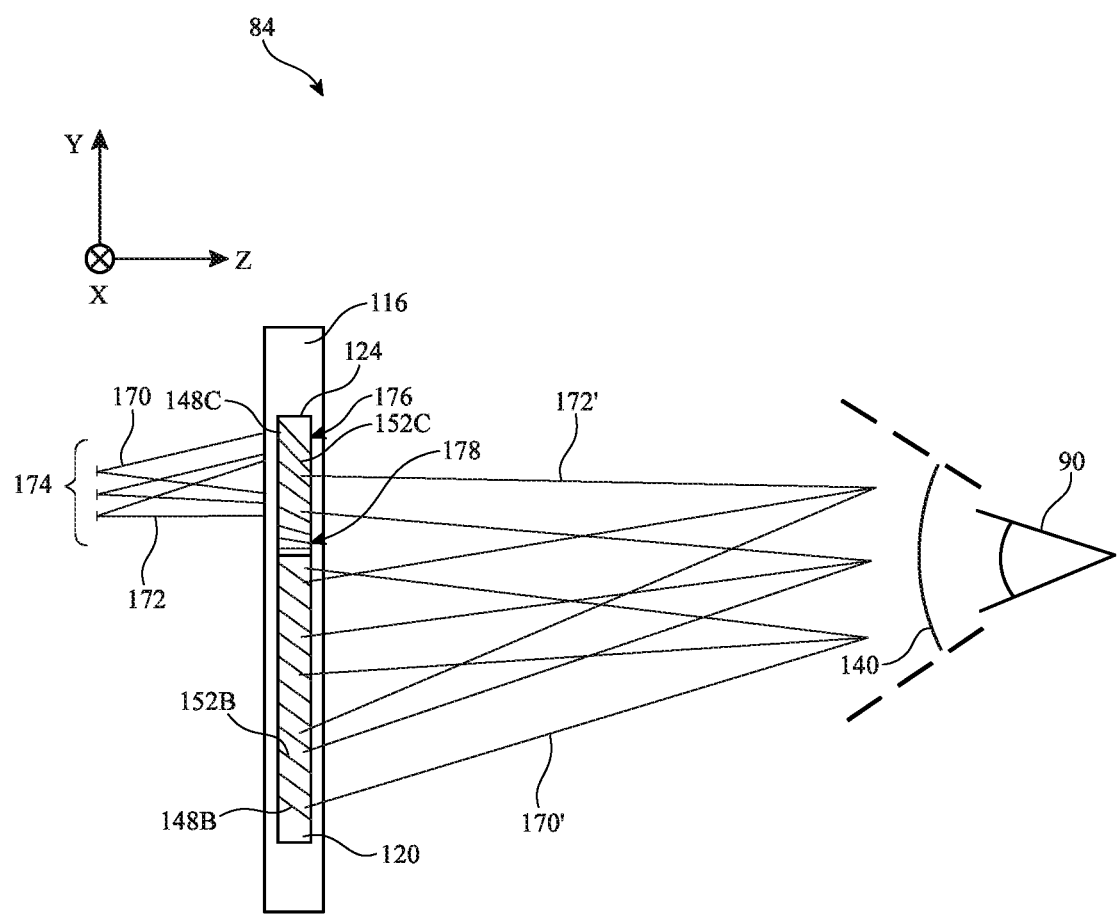
FIG. 8 is a side view of an illustrative optical system having a volume phase holographic grating with constant pitch and variable period that redirects upper field of view light and lower field of view light so that it exits the optical system towards the eyebox in accordance with an embodiment.

If desired, volume phase holographic gratings with constant pitch and variable period may also be used to form vertical field of view expansion gratings. This type of arrangement is illustrated in FIG. 8. As shown in FIG. 8, optical system 84 may include vertical field of view expansion grating 124. In this example, grating 124 is located between input coupler 114 (not shown in FIG. 8 because it is behind grating 124) and output coupler 120. Grating 124 may be used to minimize the amount of light that is above or below the user's field view 140. For example, lower field of view light 170, which might otherwise pass under field of view 140, is redirected by grating 124 to reach viewer 90.

Grating 124 may be formed from a volume phase holographic grating having constant pitch and variable period, as discussed in connection with FIG. 6. For example, vertical field of view expansion grating 124 may be formed from grating 148C having fringes 152C. In grating 148C, the fringes may be tailored to maximize diffraction efficiency for a given range of field angles. Fringes 152C in portion 176 of grating 148C may have a period that maximizes diffraction efficiency for lower field of view light 170; fringes 152C in portion 178 of grating 148C may have a period that maximizes diffraction efficiency center field of view light 172; and the lower portion of grating 148C (not shown because it is behind output coupler 120 of FIG. 8) may have fringes 152C with a period that maximizes diffraction efficiency for upper field of view light (not shown in FIG. 8). To maximize diffraction efficiency at a given field angle for a given wavelength at a given location of the grating, the period of the grating at that location may be determined according to Equation 2 (e.g., the grating may be Bragg-matched to the incident angle and wavelength of incident light). This ensures that, for a given color of incident light, upper field of view light, center field of view light 172, and lower field of view light 170 all reach viewer 90 with uniform diffraction efficiency.

Figure 9:
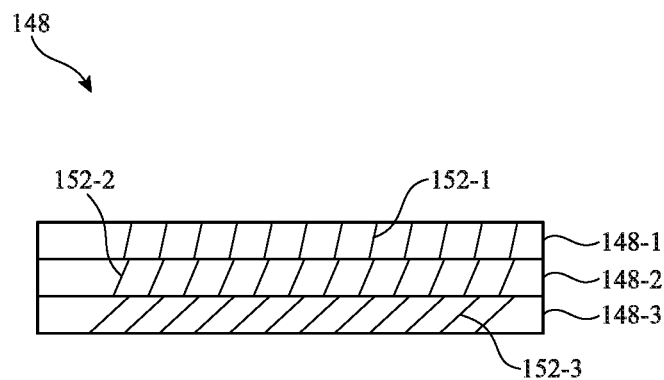
FIG. 9 is a top view of an illustrative stack of volume phase holographic gratings with the same pitch and different periods in accordance with an embodiment.
Figure 10:
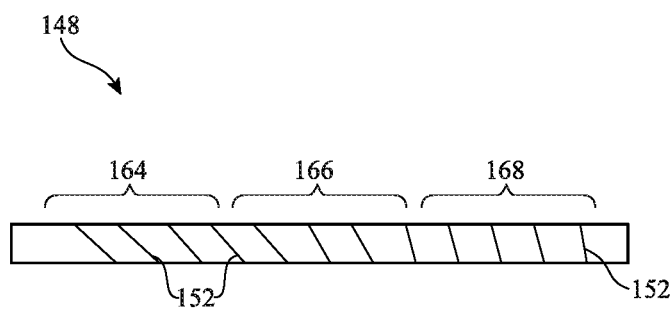
FIG. 10 is a top view of an illustrative volume phase holographic grating having patches of gratings with periods that vary from patch to patch in accordance with an embodiment.
Figure 11:
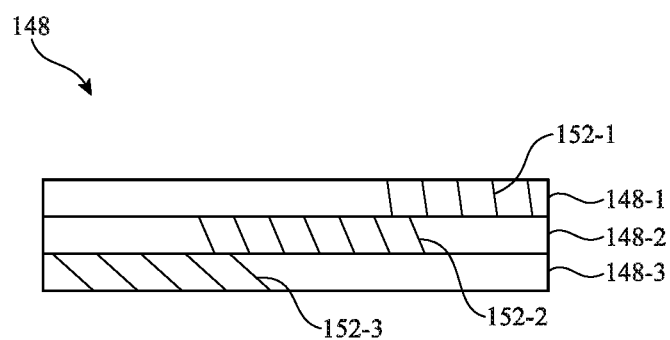
FIG. 11 is a top view of an illustrative stack of volume phase gratings with overlapping patches of gratings with periods that vary from patch to patch in accordance with an embodiment.

In some arrangements, the fringe period of grating 148 (e.g., grating 148A, 148B, and/or grating 148C) may vary continuously across grating 148, such that the spacing between each pair of fringes is different from the spacing between the next pair of fringes (e.g., as shown in the example of FIG. 6). In other arrangements, a constant-pitch, variable-period grating may be achieved using gratings that are entirely linear (e.g., using gratings of the type shown in FIG. 4) or that have patches of linear fringes. FIGS. 9, 10, and 11 illustrate various examples of grating arrangements that may be used to achieve a similar result as a single grating with a constant pitch and continuously varying period.

In the example of FIG. 9, grating 148 is formed from multiple stacked gratings, with each grating tailored to a specific subset of field angles. In particular, for a given color of light, grating 148-1 may have fringes 152-1 with a fringe period that maximizes diffraction efficiency for left field of view angles; grating 148-2 may have fringes 152-2 with a fringe period that maximizes diffraction efficiency for center field of view angles, and grating 148-3 may have fringes 152-3 with a fringe period that maximizes diffraction efficiency for right field of view angles. All three gratings may have the same pitch, and each grating may also have a constant period across that grating. However, the period of each grating may be different from the period of the other gratings in the stack (e.g., the period of fringes 152-1, the period of fringes 152-2, and the period of fringes 152-3 may be different from one another), yielding a similar effect as that of a single grating with constant pitch and variable period.

It should be understood that the example of FIG. 9 in which grating 148 is formed from a stack of three gratings is merely illustrative. If desired, grating 148 may be made up of four, five, six, more than six, or fewer than six gratings.

In the example of FIG. 10, grating 148 is made up of patches of constant-pitch, constant-period fringes. Each patch may be tailored to a specific subset of field angles. In particular, for a given color of light, portion 164 of grating 148 may have fringes 152 with a period that maximizes diffraction efficiency for left field of view angles; portion 166 of grating 148 may have fringes 152 with a period that maximizes diffraction efficiency for center field of view angles, and portion 168 of grating 148 may have fringes 152 with a period that maximizes diffraction efficiency for right field of view angles. All three patches in grating 148 may have the same pitch, and each patch may also have a constant period across that patch. However, the period of each patch may be different from the period of the other patches in the grating, yielding a similar effect as that of a grating with a constant pitch and continuously varied period.

In the example of FIG. 11, grating 148 is formed from multiple stacked gratings, with each grating tailored to a specific subset of field angles. In particular, for a given color of light, grating 148-1 may have a patch of fringes 152-1 with a period that maximizes diffraction efficiency for left field of view angles; grating 148-2 may have a patch of fringes 152-2 with a period that maximizes diffraction efficiency for center field of view angles, and grating 148-3 may have a patch of fringes 152-3 with a period that maximizes diffraction efficiency for right field of view angles. All three patches of fringes may have the same pitch, and each patch may also have a constant period across that patch. However, the period of each patch may be different from the period of the other patches in the stack, yielding a similar effect as that of a single grating with constant pitch and variable period.

The examples of FIGS. 6-11 in which the different grating regions are spatially separated are merely illustrative. If desired, a multiplexing arrangement in which multiple gratings are superimposed in a common holographic medium may be used to achieve a constant-pitch, variable-period grating. For example, fringes of a first pitch and a first period, fringes of the first pitch and a second period, and fringes of the first pitch and a third period may be multiplexed within a common holographic medium. Multiplexing constant pitch gratings may be used, for example, to address multiple colors (e.g., multiple wavelengths) in a single layer of holographic media.

Figure 12:
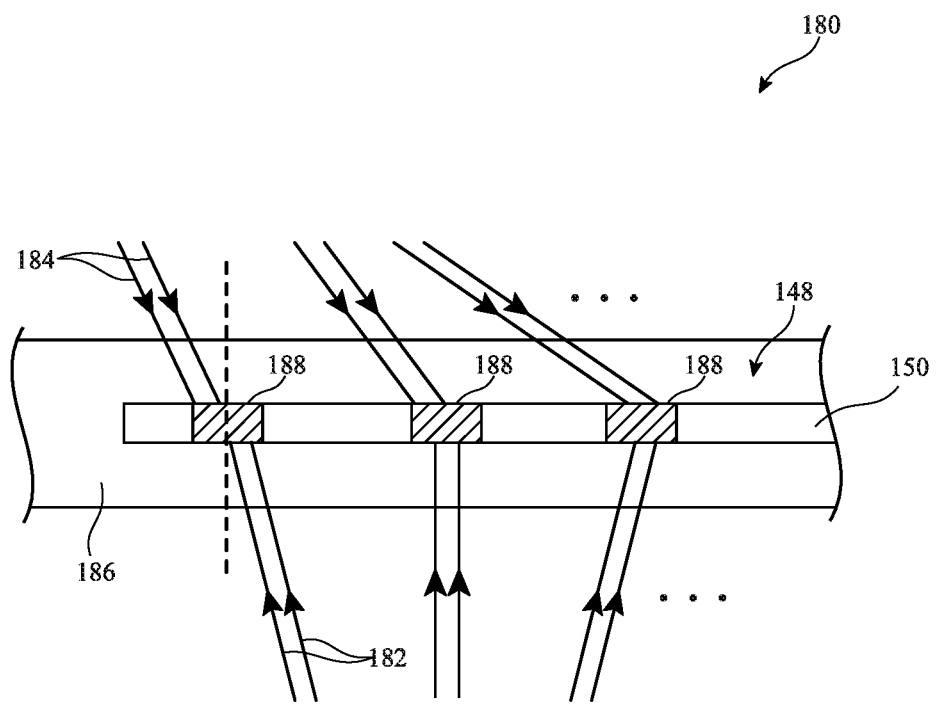
FIG. 12 is a diagram of an illustrative recording setup for patch-writing a constant-pitch, variable-period volume phase holographic grating in accordance with an embodiment.
Figure 13:
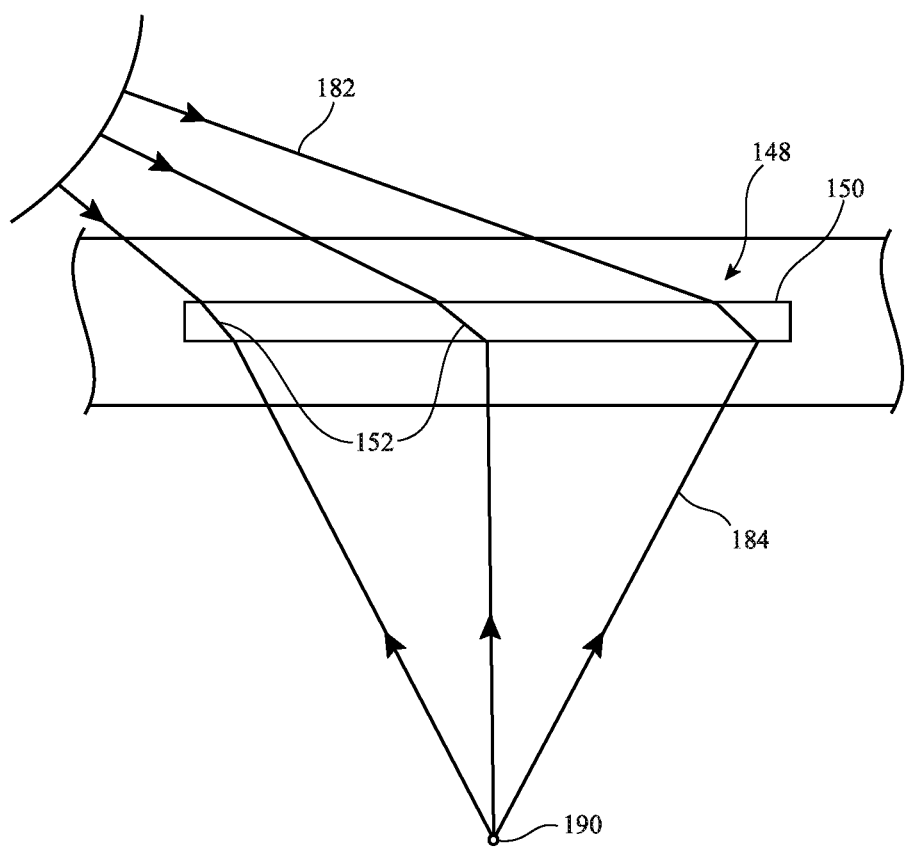
FIG. 13 is a diagram of an illustrative recording setup for recording a constant-pitch, variable-period volume phase holographic grating using a complex wavefront reference recording beam in accordance with an embodiment.

Illustrative examples of holographic recordings systems that may be used to record a constant-pitch, variable-period volume phase holographic grating of the type described in connection with FIGS. 6-11 are shown in FIGS. 12 and 13.

In the example of FIG. 12, a constant-pitch, variable period volume phase holographic grating is recorded in patches using a sequential recording setup. As shown in FIG. 12, system 180 may include recording beams such as signal laser beams 182 and reference laser beams 184. Signal beams 182 and reference beams 184 can be positioned at various angles with respect to index-matching material 186. Index-matching material 186 may have a cavity that receives holographic structure 148. Holographic structure 148 initially includes an unexposed recording medium such as layer 150 of FIG. 6. Following exposure to laser light from the recording beams of system 180, a grating is recorded in the recording medium such as grating 148 of FIG. 7.

A laser system may produce laser light for use in recording grating 148 in structure 150. During operation, signal and reference laser beams pass through index-matching material 186 to reach holographic structure 150. To form fringes 150 in grating 148 with constant pitch and variable period, patches such as patches 188 of fringes in grating 148 may be recorded sequentially, using plane-wave signal and reference beams to record each patch. With each subsequent patch of fringes, the recording beams may be reoriented to maintain the same pitch while varying the period to achieve the desired diffraction efficiency for a given input angle. For example, a first patch 188 of fringes with a first pitch and a first period may be recorded using plane-wave signal beams 182 and 184. A second patch 188 of fringes with the same pitch as the first patch but with a different period may then be recorded by changing the orientation of plane-wave signal beams 182 and 184 (e.g., by changing the separation between the recording beams and changing the angle of the recording beams relative to medium 150). Subsequent patches 188 may be recorded, reorienting the recording beams for each patch to achieve the desired diffraction efficiency at that location of grating 148.

FIG. 13 illustrates an example in which a constant-pitch, variable-period grating is recorded using recording beams with a non-planar wavefronts. As shown in FIG. 13, recording beams may include signal beam 184 and reference beam 182. Recording signal beam 184 may be generated by a diverging point source 190 positioned at a nominal location of the eye during playback. Reference recording beam 182 may contain a complex wavefront. The wavefront may, for example, be identical to the wavefront generated by a diverging point source (e.g., points source 190) diffracting off of medium 150. Rather than using multiple exposures as in the recording example of FIG. 12, the recording beams of FIG. 13 are oriented relative to medium 150 so as to produce constant-pitch, variable-period fringes 152 in medium 150 in a single exposure (although multiple exposures may be used, if desired).

In accordance with an embodiment, an electronic device is provided that includes, a display system configured to produce images, and an optical system having an input portion and an output portion, the optical system includes, a waveguide that extends between the input portion and the output portion, an input coupler in the input portion, the input coupler is configured to couple the images from the display system into the waveguide, and an output coupler in the output portion, the output coupler is configured to couple the images out of the waveguide, at least one of the input coupler and the output coupler includes: a volume phase holographic grating with a constant pitch and a variable period.

In accordance with another embodiment, the volume phase holographic grating includes fringes in a holographic medium, each fringe is oriented at a fringe angle relative to a surface normal of the holographic medium, and the fringe angle varies across the holographic medium.

In accordance with another embodiment, the fringes include a first set of fringes oriented at a first fringe angle, a second set of fringes oriented at a second fringe angle, and a third set of fringes oriented at a third fringe angle.

In accordance with another embodiment, the first set of fringes has a first period that is Bragg-matched to incident light associated with a left field of view, the second set of fringes has a second period that is Bragg-matched to incident light associated with a center field of view, and the third set of fringes has a third period that is Bragg-matched to incident light associated with a right field of view.

In accordance with another embodiment, the period of the volume phase holographic grating varies continuously across the volume phase holographic grating.

In accordance with another embodiment, the volume phase holographic grating includes first, second, and third gratings arranged in a stack, the first grating has fringes with a first pitch and a first period, the second grating has fringes with the first pitch and a second period, and the third grating has fringes with the first pitch and a third period.

In accordance with another embodiment, including an additional volume phase holographic grating in the waveguide between the input coupler and the output coupler.

In accordance with another embodiment, the additional volume phase holographic grating has a constant pitch and a variable period.

In accordance with another embodiment, the additional volume phase holographic grating includes fringes in a holographic medium, each fringe is oriented at a fringe angle relative to a surface normal of the holographic medium, and the fringe angle varies across the holographic medium.

In accordance with another embodiment, the fringes include a first set of fringes oriented at a first fringe angle and a second set of fringes oriented at a second fringe angle.

In accordance with another embodiment, the first set of fringes has a first period that is Bragg-matched to incident light associated with an upper field of view, and the second set of fringes has a second period that is Bragg-matched to incident light associated with a lower field of view.

In accordance with an embodiment, a volume phase holographic grating is provided that includes, a medium having first, second, and third portions, and fringes in the medium, the fringes have a uniform pitch across the first, second, and third portions of the medium, the fringes in the first portion have a first period, the fringes in the second portion have a second period, and the fringes in the third portion have a third period, the first, second, and third periods are different, and the first period maximizes diffraction efficiency for incident light of a given wavelength and a first incident angle, the second period maximizes diffraction efficiency for incident light of the given wavelength and a second incident angle, and the third period maximizes diffraction efficiency for incident light of the given wavelength and a third incident angle.

In accordance with another embodiment, the period of the fringes in the holographic medium varies continuously across the medium.

In accordance with another embodiment, the medium includes first, second, and third holographic mediums, the fringes with the first period are formed in the first holographic medium, the fringes with the second period are formed in the second holographic medium, and the fringes with the third period are formed in the third holographic medium.

In accordance with another embodiment, the medium has a surface normal, the fringes are oriented at a fringe angle relative to the surface normal, and the fringe angle varies across the medium.

In accordance with an embodiment, a display system is provided that includes, a waveguide, a first holographic grating that couples light into the waveguide, and a second holographic grating that couples light out of the waveguide, at least one of the first and second holographic gratings has fringes with a constant pitch and a variable period.

In accordance with another embodiment, the first and second holographic gratings include volume phase holographic gratings.

In accordance with another embodiment, the fringes include a first set of fringes that are oriented to maximize diffraction efficiency for incident angles associated with a left field of view, a second set of fringes that are oriented to maximize diffraction efficiency for incident angles associated with a center field of view, and a third set of fringes that are oriented to maximize diffraction efficiency for incident angles associated with a right field of view.

In accordance with another embodiment, the first, second, and third sets of fringes are multiplexed within a holographic medium.

In accordance with another embodiment, a third holographic grating that redirects light within the waveguide, the third holographic grating has fringes with a constant pitch and a variable period.

In accordance with another embodiment, the fringes of the third holographic grating include a first set of fringes oriented to maximize diffraction efficiency for incident angles associated with an upper field of view and a second set of fringes oriented to maximize diffraction efficiency for incident angles associated with a lower field of view.

The foregoing is merely illustrative and various modifications can be made to the described embodiments. The foregoing embodiments may be implemented individually or in any combination.

What is claimed is:
1. An electronic device, comprising:
a display system configured to produce images; and
an optical system having an input portion and an output portion, wherein the optical system comprises:
  a waveguide that extends between the input portion and the output portion;
  an input coupler in the input portion, wherein the input coupler is configured to couple the images from the display system into the waveguide;
  an output coupler in the output portion, wherein the output coupler is configured to couple the images out of the waveguide; and a volume phase holographic grating with a constant pitch and a variable period, wherein the volume phase holographic grating comprises fringes in a holographic medium, wherein the fringes comprise a first set of fringes oriented at a first fringe angle and a second set of fringes oriented at a second fringe angle, wherein the first set of fringes has a first period that is Bragg-matched to incident light associated with an upper field of view, and wherein the second set of fringes has a second period that is Bragg-matched to incident light associated with a lower field of view.

2. The electronic device defined in claim 1 wherein at least one of the input coupler and the output coupler comprises an additional volume phase holographic grating with a constant pitch and a variable period, wherein the additional volume phase holographic grating comprises fringes in a holographic medium, wherein each fringe is oriented at a fringe angle relative to a surface normal of the holographic medium, and wherein the fringe angle varies across the holographic medium.

3. The electronic device defined in claim 2 wherein the fringes of the additional volume phase holographic grating comprise a first set of fringes oriented at a first fringe angle, a second set of fringes oriented at a second fringe angle, and a third set of fringes oriented at a third fringe angle.

4. The electronic device defined in claim 3 wherein the first set of fringes has a first period that is Bragg-matched to incident light associated with a left field of view, the second set of fringes has a second period that is Bragg-matched to incident light associated with a center field of view, and the third set of fringes has a third period that is Bragg-matched to incident light associated with a right field of view.

5. The electronic device defined in claim 2 wherein the period of the additional volume phase holographic grating varies continuously across the additional volume phase holographic grating.

6. The electronic device defined in claim 2 wherein the additional volume phase holographic grating comprises first, second, and third gratings arranged in a stack, wherein the first grating has fringes with a first pitch and a first period, the second grating has fringes with the first pitch and a second period, and the third grating has fringes with the first pitch and a third period.

7. The electronic device defined in claim 1 wherein each fringe is oriented at a fringe angle relative to a surface normal of the holographic medium, and wherein the fringe angle varies across the holographic medium.

8. A volume phase holographic grating, comprising:
a medium having first, second, and third portions;
fringes in the medium, wherein the fringes have a uniform pitch across the first, second, and third portions of the medium, wherein the fringes in the first portion have a first period, the fringes in the second portion have a second period, and the fringes in the third portion have a third period, wherein the first, second, and third periods are different, and wherein the first period maximizes diffraction efficiency for incident light of a given wavelength and a first incident angle, the second period maximizes diffraction efficiency for incident light of the given wavelength and a second incident angle, and the third period maximizes diffraction efficiency for incident light of the given wavelength and a third incident angle; and
additional fringes in the medium, wherein the additional fringes comprise a first set of fringes oriented to maximize diffraction efficiency for incident angles associated with an upper field of view and a second set of fringes oriented to maximize diffraction efficiency for incident angles associated with a lower field of view.

9. The volume phase holographic grating defined in claim 8 wherein the period of the fringes in the holographic medium varies continuously across the medium.

10. The volume phase holographic grating defined in claim 8 wherein the medium comprises first, second, and third holographic mediums, wherein the fringes with the first period are formed in the first holographic medium, the fringes with the second period are formed in the second holographic medium, and the fringes with the third period are formed in the third holographic medium.

11. The volume phase holographic grating defined in claim 8 wherein the medium has a surface normal, wherein the fringes are oriented at a fringe angle relative to the surface normal, and wherein the fringe angle varies across the medium.

12. A display system, comprising:
a waveguide;
a first holographic grating that couples light into the waveguide;
a second holographic grating that couples light out of the waveguide, wherein at least one of the first and second holographic gratings has fringes with a constant pitch and a variable period; and
a third holographic grating that redirects light within the waveguide, wherein the third holographic grating has fringes with a constant pitch and a variable period, and wherein the fringes of the third holographic grating comprise a first set of fringes oriented to maximize diffraction efficiency for incident angles associated with an upper field of view and a second set of fringes oriented to maximize diffraction efficiency for incident angles associated with a lower field of view.

13. The display system defined in claim 12 wherein the first and second holographic gratings comprise volume phase holographic gratings.

14. The display system defined in claim 12 wherein the fringes of at least one of the first and second holographic gratings comprise a first set of fringes that are oriented to maximize diffraction efficiency for incident angles associated with a left field of view, a second set of fringes that are oriented to maximize diffraction efficiency for incident angles associated with a center field of view, and a third set of fringes that are oriented to maximize diffraction efficiency for incident angles associated with a right field of view.

15. The display system defined in claim 14 wherein the first, second, and third sets of fringes are multiplexed within a holographic medium.

* * * * *